July 14, 1959   D. A. GRIFFIN   2,894,657
BABY FOOD WARMER
Filed Oct. 1, 1957
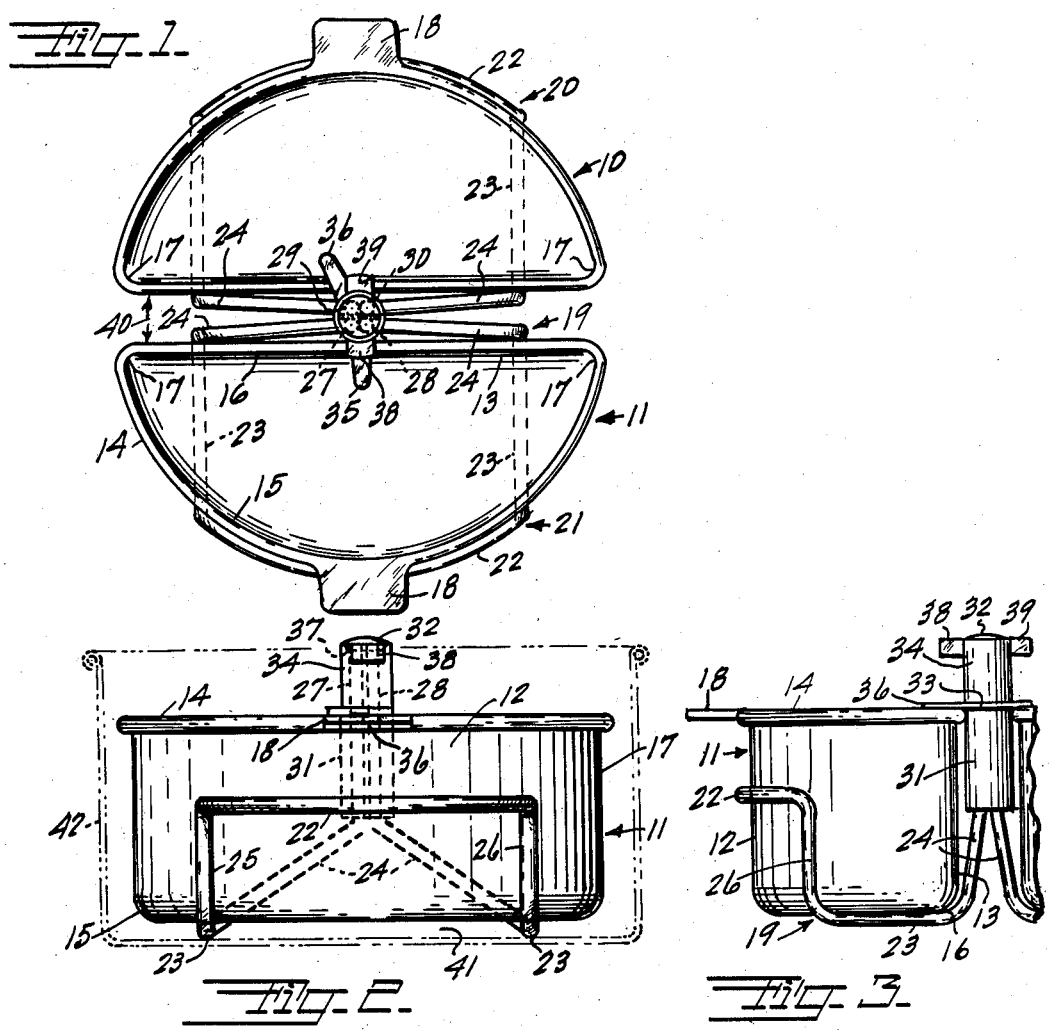
INVENTOR.
Dorothea A. Griffin
BY Philip A. Friedell
Attorney

United States Patent Office 2,894,657
Patented July 14, 1959

2,894,657
BABY FOOD WARMER
Dorothea A. Griffin, Oakland, Calif.

Application October 1, 1957, Serial No. 687,439

4 Claims. (Cl. 220—23.4)

This invention relates to improvements in means for warming baby foods, and provides a practical, quick-warming, dual unit of the simplest possible construction, and in which the containers are easily removed, yet are jointly or selectively locked against floating or displacement in the holder, with the containers formed for accurate pouring even into a bottle without recourse to a funnel, and with all corners of the containers well rounded for efficient cleaning and sterilization, and arranged so that one or both pans can be used at will.

The holder is formed in two identical parts which are locked together by means of a sleeve, making the holder easy to form and economical to manufacture, each holding one pan against lateral or rotational movement, and having a turn lock which will lock either or both containers against floating and which will selectively release either of the containers.

The objects and advantages of the invention are as follows:

First, to provide a baby food warmer with a pair of substantially semi-cylindrical pans each provided with a handle, and with the ends of the pans formed to a relatively small radius for convenient pouring into a bottle or the like without recourse to a funnel.

Second, to provide a baby food warmer as outlined with a carrier consisting of two identical members formed of wire and each including a front guard for engaging the front of the pan, spaced base members for support of the pan, rear members for engaging the back of the pan with the rear members of both terminating in a common spindle extending above the tops of the pans, for simple and economical construction and efficient retention of the pans against lateral or rotational movement.

Third, to provide the spindle as outlined with a manual gripping and rotating means and including angularly related hold-down members for simultaneously engaging the tops of both pans and selectively releasing either pan for removal from the rack at will.

Fourth, to provide a carrier as outlined which provides no pockets in the base portion so as to provide free escape of steam from under the pans when the water in the containing pot is boiling.

In describing the invention reference will be had to the accompanying drawings, in which:

Fig. 1 is a top plan view of the invention.

Fig. 2 is a front elevation showing the baby food warmer in a pot shown in dotted lines, as for heating the baby food.

Fig. 3 is a fragmentary side elevation of Fig. 2, with the pot omitted.

The invention consists of two identical pans 10 and 11 which are substantially semicylindrical in form, having an arcuate front wall 12 and straight back wall 13, and having curled top edges 14, all corners being rounded as indicated at 15, 16 and 17 for efficient cleaning and sterilization, the end corners 17 having a relatively small radius to provide for easy pouring of the contents into a bottle without recourse to a funnel, and each pan having a handle 18 formed or applied to the top at the center of the front wall.

The carrier 19 is formed in two identical parts 20 and 21, each formed from a single piece of wire, the central portion of which is arcuately formed as indicated at 22 to engage the front wall intermediate its height, the ends of the arcuate portion being bent down at right angles and thence bent around under the pans to form supports in parallel as indicated at 23, thence bent upwardly about the back of the pan and inwardly toward the axis as indicated at 24, the drop or bent down portions 25 and 26 being located about 90 degrees apart, the carrier thus holding the pan against either lateral or rotational movement.

The four terminal ends 27, 28, 29 and 30 being brought together, after which a sleeve 31 is slipped over the group, and suitable sealing means such as molten lead is poured in the top of the tube or sleeve and allowed to form an arched head as indicated at 32.

The sleeve 31 is provided with a shoulder 33 substantially in the plane of the top of the container, and a knob 34 having fingers 35 and 36 fixed to the bottom and resting on the shoulder is rotatable on the sleeve, the knob being countersunk as indicated at 37, the countersink being treated to prevent adherence of the lead and thus being secured against removal. This knob is also provided with projections 38 and 39 at its upper end so that the unit can be lifted by the spanned fingers of a hand.

As will be noted, the holddown fingers 35 and 36 are angularly related, being spaced about 135 degrees apart, thus permitting the knob to be turned to a position where one pan is released for removal while the other is still locked in the carrier.

The spacing 40 between the backs of the pans is just sufficient to clear the knob, and the spacing angularly of the fingers 35 and 36 cannot be less than 135 degrees and may be as great as 150 degrees as shown.

Either or both pans can be used at will, there can be no gathering of bubbles under the pan as all passages such as at 41 are unobstructed, and the pans cannot float out of the carrier, and since the assembly is cylindrical in form, the unit can be used in a pot 42 just a little larger in diameter.

I claim:

1. A baby food warmer, in combination, two identical pans substantially semicylindrical in form and having an arcuate front wall and straight back wall and provided with well rounded corners for efficient cleaning and with the end corners slightly rounded for pouring directly into a bottle or the like without recourse to a funnel, and a carrier formed of two identical elements each consisting of a front guard terminating in approximately 90 degree spaced relation and passing therefrom downwardly and under the pan to provide supports in parallel and thence around the back of the pan to secure the pan against lateral or rotational movement and thence terminating in a common spindle, and a knob rotatably adjustable on said spindle, said knob having angularly related laterally projecting locking fingers engageable with the tops of the pans for simultaneous engagement and for selective release of the pans through rotary adjustment of said knob.

2. A baby food warmer comprising two identical pans substantially semi-cylindrical in form and having arcuate front walls and straight back walls, a carrier comprising two identical units each consisting of a single length of wire arcuately formed centrally of its length to span an angle of substantially 90 degrees about the front wall and thence being bent down and thence horizontally in parallel to form supports for the pan, and thence being bent upwardly about the back of the pan to retain the pan against lateral or rotational movement and converging to the axis of the carrier with the terminal ends of both units being formed perpendicular to the supports and gathered to form a spindle, and means rotatable on said spindle and including a knob for lifting the carrier at will, and laterally projecting angularly related fingers on said knob for locking the pans in the carrier against floating, said knob being movable to two positions for selectively releasing the pans for removal.

3. A baby food warmer comprising a pair of substantially semi-cylindrical pans each having an arcuate front wall and a back wall, and a carrier having a guard cooperative with the front wall of each pan and each spanning an angle of approximately ninety degrees and including bottom supports terminating in guard members cooperative with the back walls to retain the pans against lateral or rotational movement, and an axial spindle for said guard extending upwardly between the adjacent back walls of the pans, and gripping means rotatable on said spindle and having a pair of fingers cooperatively related to the tops of the back walls and fixed to the gripping means and movable thereby to three positions, in one of which the fingers secure the pans against floating or removal and in the two others of which the pans are selectively released for removal.

4. A structure as defined in claim 3, said guard members cooperative with the back walls terminating in perpendicular members grouped together and having a sleeve placed thereover to form said spindle, said sleeve having a shoulder with said gripping means resting on said shoulder and fixed against removal from said sleeve.

References Cited in the file of this patent

UNITED STATES PATENTS

| | | |
|---|---|---|
| 289,586 | Wanner | Dec. 4, 1883 |
| 756,591 | Cramer | Apr. 5, 1904 |
| 909,715 | Thoegeler | Jan. 12, 1909 |
| 2,362,331 | Weber | Nov. 7, 1944 |